United States Patent Office 3,351,600
Patented Nov. 7, 1967

3,351,600
NOVEL INDOLE CYANINE DYESTUFFS
Alfred Brack and Roderich Raue, Leverkusen, Germany, assignors to Farbenfabriken Bayer Aktiengesellschaft, Leverkusen, Germany, a German corporation
No Drawing. Filed Apr. 1, 1965, Ser. No. 444,783
Claims priority, application Germany, Apr. 11, 1964, F 42,599
12 Claims. (Cl. 260—288)

It has been found that valuable novel dyestuffs are obtained when compounds of the general formula

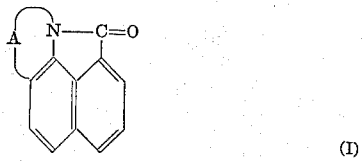

(I)

wherein A denotes the residual members of a 5- or 6-membered ring containing nitrogen and where A and the naphthalene ring may contain non-ionising substituents,
are reacted with indole derivatives of the general formula

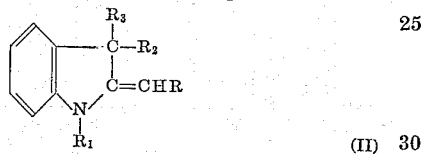

(II)

wherein R denotes hydrogen or CN and $R_1$, $R_2$ and $R_3$ represent lower alkyl groups such as $CH_3$ groups, and wherein the aromatic rings as well as the radicals $R_1$, $R_2$ and $R_3$ may contain non-ionising substituents.
Halogen atoms such as fluorine, chlorine and bromine, alkyl and alkoxy groups such as methyl, ethyl, isopropyl, methoxy and ethoxy groups, nitro and amino groups, acyl radicals and sulphonamide groups as well as non-ionising derivatives of carboxyl groups such as carboxylic acid ester, carboxylic acid amide and nitrile groups can for instance be considered as the non-ionising substituents.
The novel dyestuffs correspond to the general formula

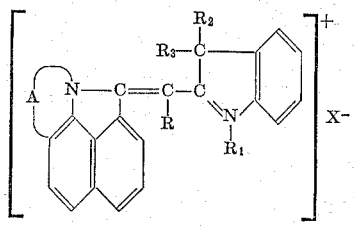

wherein A denotes the residual members of a 5- or 6-membered ring containing nitrogen, $R_1$, $R_2$ and $R_3$ stand for lower alkyl groups, R represents hydrogen or a CN substituent, and wherein X denotes an anionic radical such as the chloride, hydrogen sulphate or acetate anion or when X is a polyvalent anion it may denote the sulphate or phosphate anion; the aromatic rings as well as A, $R_1$, $R_2$ and $R_3$ may contain non-ionising substituents and the dyestuffs are free from ionising substituents such as the sulphonic acid, carboxylic acid and disulphimide groups.
In order to carry out the reaction, the reaction partners (I) and (II) are heated in an inert solvent such as benzene, toluene, chloroform, carbon tetrachloride, ethylene, chloride, chlorobenzene, dichlorobenzene, dioxan or nitrobenzene, and an agent with a water eliminating activity is added. Suitable agents of this type are chiefly the acid chlorides, such as phosphorus oxychloride, phosphorus trichloride, phosphorus pentachloride, thionyl and sulphuryl chloride and phosgene or their mixtures. An addition of Friedel-Crafts catalysts such as aluminum chloride, zinc chloride, stannic chloride, ferric chloride or boron trifluoride often proves to be an advantage. In general, the reaction is conducted at temperatures between 20 and 150° C., and preferably between 60 and 130° C.

The following are examples of suitable compounds of the general formula (I):

the cyclic lactams of the formula

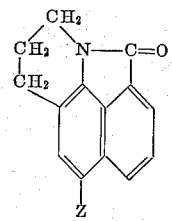

wherein Z denotes hydrogen, chlorine, bromine, an acetylamino, p-toluene-sulphonylamino, dimethylamino, methoxy, ethoxy, phenoxy, acetyl, methyl or ethyl group, and the cyclic lactams of the formula

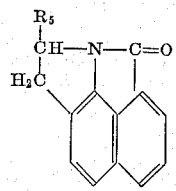

wherein $R_5$ denotes hydrogen, a methyl or a phenyl group.

These compounds can for instance be obtained by the reaction of compounds of the formula

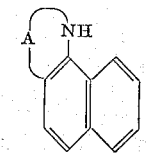

wherein A has the above specified significance and where A as well as the naphthalene ring may contain non-ionising substituents, with phosgene in inert solvents or diluents followed by a treatment with Friedel-Crafts catalysts.

Suitable compounds (II) are, for instance:

1,3,3-trimethyl-2-methylene-dihydro-(2,3)-indole;
1,3,3,5-tetramethyl-2-methylene-dihydro-(2,3)-indole;
1,3,3-trimethyl-5-methoxy-2-methylene-dihydro-(2,3)-indole;
1,3,3-trimethyl-5-ethoxy-2-methylene-dihydro-(2,3)-indole;
1,3,3-trimethyl-5-ethyl-2-methylene-dihydro-(2,3)-indole;
1,3,3-trimethyl-5-phenyl-2-methylene-dihydro-(2,3)-indole;
1,3,3-trimethyl-5-chloro-2-methylene-dihydro-(2,3)-indole;
1,3,3-trimethyl-5-bromo-2-methylene-dihydro-(2,3)-indole;
1,3,3-trimethyl-5-nitro-2-methylene-dihydro-(2,3)-indole;
1,3,3-trimethyl-5-acetylamino-2-methylene-dihydro-(2,3)-indole;
1,3,3-trimethyl-5-dimethylamino-2-methylene-dihydro-(2,3)-indole;

1,3,3-trimethyl-7-methoxy-2-methylene-dihydro-(2,3)-indole;

1,3,3-trimethyl-5-methyl-sulphonylamino-2-methylene-dihydro-(2,3)-indole;

1,3,3-trimethyl-7-chloro-2-methylene-dihydro-(2,3)-indole;

1,3,3-trimethyl-5-methoxy-7-chloro-2-methylene-dihydro-(2,3)-indole;

1,3,3-trimethyl-5-nitro-7-chloro-2-methylene-dihydro-(2,3)-indole;

1,3,3-trimethyl-4,7-dimethoxy-2-methylene-dihydro-(2,3)-indole;

1-ethyl-3,3-dimethyl-2-methylene-dihydro-(2,3)-indole;

1-ethyl-3,3-dimethyl-2-methylene-dihydro-(2,3)-indole-5-carboxylic acid ethyl ester;

1,3,3-trimethyl-2-methylene-dihydro-(2,3)-indole-5-carboxylic acid methyl ester;

1,3,3-trimethyl-ω-cyano-2-methylene-5-methoxy-dihydro-(2,3)-indole;

1,3,3-trimethyl-ω-cyano-2-methylene-dihydro-(2,3)-indole;

1,3,3-trimethyl-ω-cyano-2-methylene-5-chloro-dihydro-(2,3)-indole and 1,3,3-trimethyl-ω-cyano-2-methylene-dihydro-(2,3)-indole-5-carboxylic acid methyl ester.

It has to be understood that the type of the anion X usual in basic dyestuff does not effect the dyeing properties of the novel dyestuffs. From their preparation the dyestuffs will normally exhibit anions like halide anions, in particular Cl⁻ and/or Br⁻, or sulfonate groups, such as —$OSO_3CH_3^-$ or —$OSO_3C_2H_5^-$ or p-toluene sulfonate; in general, the nature of the anion depends on the mode of production, purification and/or precipitation of the dyestuff. The anion can, however, be replaced by other anions normally encountered in dyestuff salts of basic dyestuffs by methods known as such; for this purpose the dyestuff salt is first converted into the free base by neutralizing it with a basic reagent, such as sodium or carbonate, sodium hydroxide and the like, and when this base is then converted into the form of the desired salt with the corresponding organic or inorganic acid by means of this procedure, it is possible to obtain dyestuff salts which contain, for example, [$BF_4$]⁻, benzene sulfonate, phosphate, acetate, chloro zincate, perchlorate, nitrate, sulfate, oxalate, formate, citrate, maleinate, tartrate, benzoate, lactate, propionate, butyrate or succinate radicals as the anions.

The novel dyestuffs are suitable for dyeing, printing and bulk dyeing of synthetic or semi-synthetic materials, for instance of synthetic polyamides or of acetate silk, of cellulose masses such as paper, for dyeing leather and also for their application in rubber printing and for the production of writing pastes and liquids, but they are particularly suitable for dying, printing and spin dyeing of materials consisting wholly or predominantly of polymerised acrylonitrile and/or vinylidene cyanide. The dyeings and prints on the last mentioned materials are characterised by excellent fastness properties, in particular by fastness to light, washing, abrasion, sublimation and hot pressing. The novel dyestuffs have a good absorption capacity for these materials and produce deep colour shades.

The parts specified in the following examples, which are given for the purpose of illustrating the invention, are parts by weight.

*Example 1*

52.5 parts of the cyclic lactam of the formula

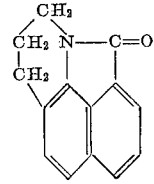

and 57.5 parts of 1,3,3-trimethyl-ω-cyano-2-methylene-5-methoxy-dihydro-(2,3)-indole are heated to boiling for 4 hours with 750 parts of chloroform and 90 to 100 parts of phosphorus oxychloride. The chloroform is then distilled off together with the unconsumed phosphorus oxychloride. The residual crude dyestuff is purified by recrystalization from water. It corresponds to the formula

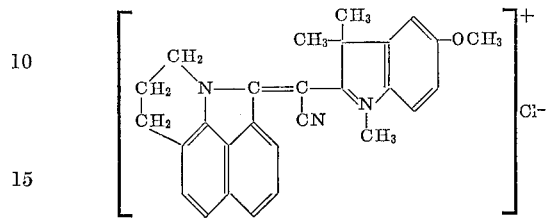

and dyes polyacrylonitrile materials to violet shades with excellent fastness properties.

When an equivalent quantity of one of the following indole derivatives is in each case employed in the place of the above specified indole derivative, very fast dyestuffs are again obtained by an otherwise identical procedure.

| Indole derivative: | Colour shade of dyeing on polyacrylonitrile |
|---|---|
| 1,3,3 - Trimethyl-ω-cyano-2-methyl-methylene-dihydro-(2,3)-indole | Red-violet. |
| 1-Ethyl-3,3-dimethyl - ω - cyano-2-methylene dihydro-(2,3)-indole | Red-violet. |
| 1,3,3-Trimethyl-ω-cyano - 5 - chloro-2 - methylene - dihydro-(2,3)-indole | Violet. |
| 1,3,3 - Trimethyl-ω-cyano-5-bromo-2-methylene - dihydro - (2,3)-indole | Violet. |
| 1,3,3 - Trimethyl-ω-cyano-7 - methoxy - 2 - methylene-dihydro-(2,3) indole | Reddish violet. |
| 1,3,3 - Trimethyl-ω-cyano-7 - ethoxy-2-methylene - dihydro - (2,3) indole | Reddish violet. |
| 1,3,3 - Trimethyl-ω-cyano-7-chloro-2-methylene-dihydro - (2,3) - indole | Reddish violet. |
| 1,3,3 - Trimethyl-ω-cyano-7 - ethyl-2-methylene - dihydro - (2,3)-indole | Red violet. |
| 1,3,3,5 - Tetramethyl-ω-cyano - 2-methylene-dihydro-(2,3)-indole | Red violet. |

The cyclic lactam had been prepared as follows:

90 parts of 7,8-benzo-quinoline are dissolved in 350 parts by volume of dioxan and hydrogenated at 70° C. with hydrogen at a pressure of 100 atmospheres after 12.3 parts of Raney nickel have been added. The absorption of hydrogen is completed after 21 hours. The catalyst is filtered off, dioxan distilled off and the residue distilled in vacuo. 88.6 parts of 1,2,3,4-tetrahydro-7,8-benzo-quinoline of B.P. 110 to 123° C./0.2 mm. Hg. are obtained. The compound melts at 41 to 43° C. after it has been recrystallized from ligroin.

78.0 parts of 1,2,3,4-tetrahydro-7,8-benzo-quinoline are dissolved in 280 parts by volume of o-dichlorobenzene and phosgene is passed in at 160° C. for 3½ hours. Air is thereafter passed through the reaction mixture at 140° C. for 3 hours. 220 parts by volume of o-dichlorobenzene are distilled off and the resultant carbamic acid chloride is introduced into a suspension of 106.8 parts of anhydrous aluminum chloride in 154 parts by volume of o-dichlorobenzene which had been heated to 140° C. It is stirred at 140° C. for 50 minutes, left to cool down to 40° C. and the reaction mixture is added to 300 parts of ice water. The organic phase is separated, the aqueous solution thoroughly extracted by shaking with o-dichlorobenzene, and the combined solutions in o-dichlorobenzene are washed with 10% sodium carbonate solution and with water. After the solution has been dried over sodium sulphate, o-dichlorobenzene is distilled off in vacuo and the residue distilled in a high vacuum. 78.2 parts of the compound with the formula

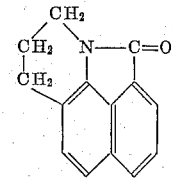

pass over at 176 to 223° C./0.25 mm. Hg. After it has been recrystallized from alcohol, this compound melts at 126 to 128° C.

*Example 2*

53 parts of the cyclic lactam employed in Example 1 and 44 parts of 1,3,3-trimethyl-2-methylene-dihydro-(2,3)-indole are dissolved in 200 parts of chlorobenzene. The solution is treated with 150 parts of phosphorus oxychloride at 70 to 90° C. and heated at 90 to 100° C. for 2 hours. After it has cooled down, the excess of phosphorus oxychloride is distilled off in vacuo together with the chlorobenzene. The residue is dissolved in 2000 to 5000 parts of water at 60 to 80° C., stirred with 1 to 3 parts of active charcoal for 10 to 15 minutes and filtered. The dyestuff of the formula

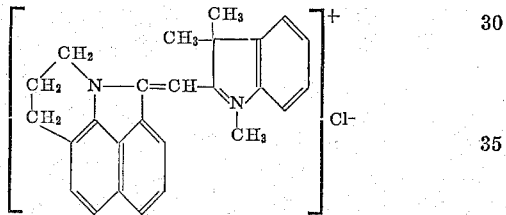

is separated from the cooled filtrate by the addition of sodium chloride and dyes polyacrylonitrile fibres and fabrics to red violet shades.

When an equivalent quantity of one of the following indole derivatives is in each case employed in the place of the above specified indole derivative, very fast dyestuffs are again obtained by an otherwise identical procedure:

| Indole derivative: | Colour shade of dyeing on polyacrylonitrile |
|---|---|
| 1,3,3,5-tetramethyl-2-methylene-dihydro-(2,3)-indole | Red violet. |
| 1,3,3-trimethyl-5-methoxy-2-methylene-dihydro-(2,3)-indole | Bluish violet. |
| 1,3,3-trimethyl-5-ethoxy-2-methylene-dihydro-(2,3)-indole | Bluish violet. |
| 1,3,3-trimethyl-5-chloro-2-methylene-dihydro-(2,3)-indole | Bluish violet. |
| 1,3,3-trimethyl-5-bromo-2-methylene-dihydro-(2,3)-indole | Bluish violet. |
| 1,3,3-trimethyl-7-chloro-2-methylene-dihydro-(2,3)-indole | Reddish violet. |
| 1,3,3-trimethyl-2-methylene-dihydro-(2,3)-indole-5-carboxylic acid methyl ester | Reddish violet. |

*Example 3*

24.3 parts of the lactam of the formula

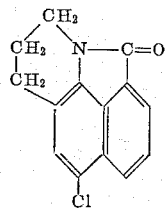

and 25.6 parts of 1-ethyl-3,3-dimethyl-5-ethoxy-ω-cyan-2-methylenedihydro-(2,3)-indole are heated at the boil for 4–5 hours with 500–600 parts of 1,2-dichloroethane. After the solvent has been distilled off, the dyestuff is recrystallized from water. It corresponds to the formula

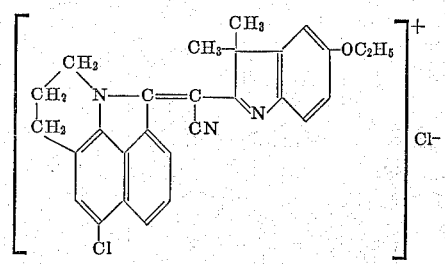

and dyes materials from polyacrylonitrile violet shades with excellent fastness properties.

If using instead of the chlorine containing lactam the equivalent amounts of the corresponding bromine compound and working up in the usual manner, the very similar dyestuff of the formula

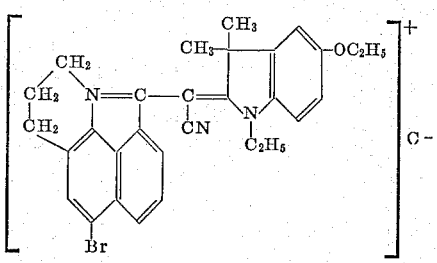

is obtained.

What is claimed is:
1. A dyestuff of the formula

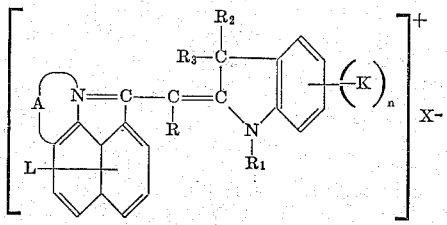

wherein A stands for —$CH_2CH_2CH_2$—, L stands for a member selected from the class consisting of hydrogen, chlorine and bromine, K stands for a member selected from the class consisting of hydrogen, lower alkyl and lower alkoxy, $R_1$ $R_2$ and $R_3$ stand for lower alkyl radicals. R represents a member selected from the class consisting of hydrogen and CN, X stands for an anion used for salt formation of basic dyestuffs and $n$ stands for an integer ranging from 1 to 2.

2. A dyestuff of the formula

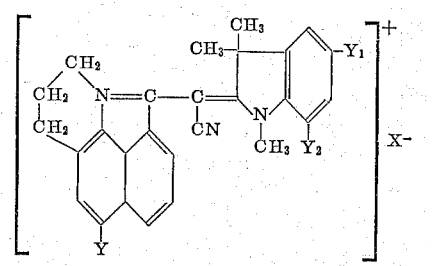

wherein Y stands for a member selected from the class consisting of hydrogen, chlorine and bromine, $Y_1$ stands for a member selected from the class consisting of hydrogen and methoxy, $Y_2$ stands for a member selected from the class consisting of hydrogen and lower alkoxy and X stands for an anion used for salt formation of basic dyestuffs.

3. The dyestuff of the formula

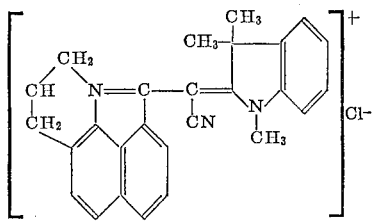

4. The dyestuff of the formula

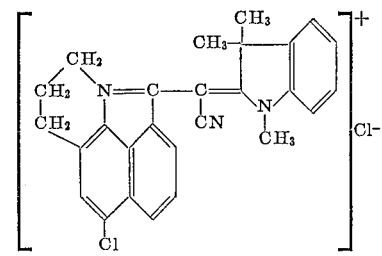

5. The dyestuff of the formula

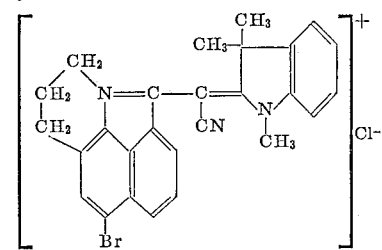

6. The dyestuff of the formula

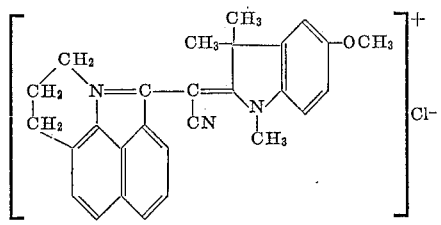

7. The dyestuff of the formula

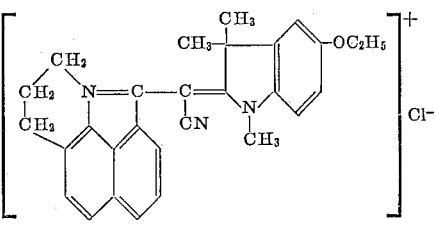

8. The dyestuff of the formula

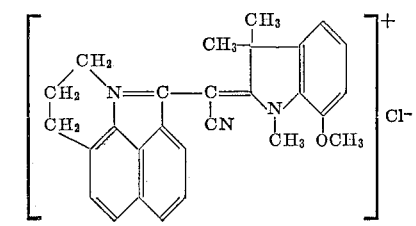

9. The dyestuff of the formula

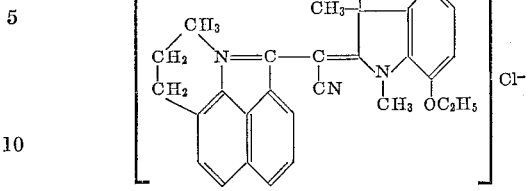

10. The dyestuff of the formula

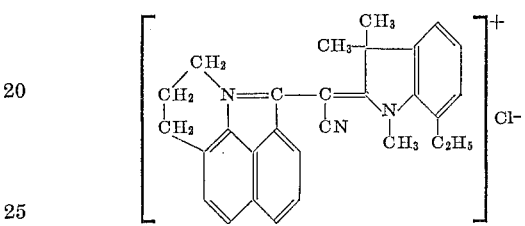

11. The dyestuff of the formula

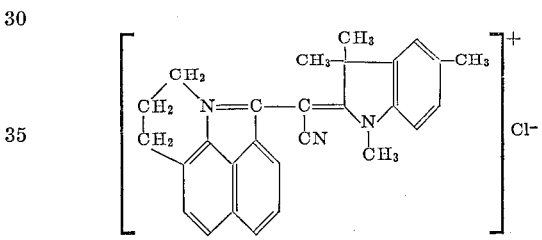

12. The dyestuff of the formula

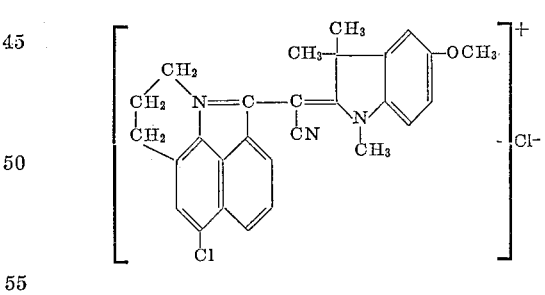

References Cited

UNITED STATES PATENTS 3,320,279   5/1967   Brack.

OTHER REFERENCES

Ficken et al.: J. Chem. Soc. 1960, pp. 1529 to 1532 and 1535 to 1541.

JOHN D. RANDOLPH, *Primary Examiner.*

UNITED STATES PATENT OFFICE
CERTIFICATE OF CORRECTION

Patent No. 3,351,600                                November 7, 1967

Alfred Brack et al.

It is hereby certified that error appears in the above numbered patent requiring correction and that the said Letters Patent should read as corrected below.

Column 4, line 7, for "recrystalization" read -- recrystallization --; line 26, for "2-methyl-methylene-dihydro-" read -- 2-methylene-dihydro- --; column 6, lines 6 to 16, for that portion of the formula reading

          read          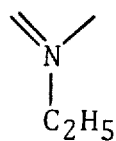

same column 6, lines 23 to 33, after the closing bracket, for "C-" read -- Cl- --; line 52, for "alkyl radicals." read -- alkyl radicals, --; column 7, lines 1 to 10, for that portion of the formula reading

          read          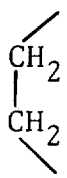

column 8, lines 2 to 11, for that portion of the formula reading

          read          

Signed and sealed this 24th day of December 1968.

(SEAL)
Attest:

EDWARD M. FLETCHER, JR.                    EDWARD J. BRENNER
Attesting Officer                              Commissioner of Patents